United States Patent
Takemura

(10) Patent No.: US 7,162,383 B2
(45) Date of Patent: Jan. 9, 2007

(54) CALIBRATION METHOD FOR SURFACE TEXTURE MEASURING INSTRUMENT, CALIBRATION PROGRAM FOR SURFACE TEXTURE MEASURING INSTRUMENT, RECORDING MEDIUM STORING THE CALIBRATION PROGRAM AND SURFACE TEXTURE MEASURING INSTRUMENT

(75) Inventor: Isamu Takemura, Kure (JP)

(73) Assignee: Mitutoyo Corporation, Kawasaki (JP)

( * ) Notice: Subject to any disclaimer, the term of this patent is extended or adjusted under 35 U.S.C. 154(b) by 352 days.

(21) Appl. No.: 10/833,007

(22) Filed: Apr. 28, 2004

(65) Prior Publication Data

US 2004/0223148 A1 Nov. 11, 2004

(30) Foreign Application Priority Data

May 8, 2003 (JP) ............................. 2003-129882

(51) Int. Cl.
*G01J 1/10* (2006.01)
(52) U.S. Cl. ..................... 702/95; 702/95; 702/150; 33/501; 33/554; 33/558; 33/559; 73/104; 73/105
(58) Field of Classification Search ............... 702/95, 702/94, 104, 150; 33/559, 558, 561, 503, 33/501, 554; 73/104, 105
See application file for complete search history.

(56) References Cited

U.S. PATENT DOCUMENTS 5,669,152 A * 9/1997 McMurtry ................. 33/559
6,633,051 B1 * 10/2003 Holloway et al. ....... 250/559.29
7,036,238 B1 * 5/2006 Kojima et al. ............... 33/503

FOREIGN PATENT DOCUMENTS

| JP | A 8-338718 | 12/1996 |
|----|------------|---------|
| JP | A 9-329402 | 12/1997 |
| JP | A 10-332304 | 12/1998 |

* cited by examiner

*Primary Examiner*—John Barlow
*Assistant Examiner*—Hien Vo
(74) *Attorney, Agent, or Firm*—Oliff & Berridge, PLC

(57) ABSTRACT

In a calibration method for a surface texture measuring instrument which measures a surface of a workpiece and includes an arm that is supported to be swingable around a base point thereof and is provided with a contact point at an end for scanning the workpiece surface, the calibration method includes a measurement step for measuring a calibration gauge of which cross section contains a part of a substantially perfect circle, an assignment step for assigning the detection results, which are obtained in the measurement step, in an evaluation formula based on a circle equation in which the center coordinates of the calibration gauge are ($x_c$, $z_c$) and the radius is "r", and a calibration step for calibrating each parameter based on the evaluation formula obtained in the assignment step.

11 Claims, 3 Drawing Sheets

$$\sin\theta = \frac{gz}{L} \qquad \cos\theta = \frac{\sqrt{L^2-(gz)^2}}{L}$$

MEASUREMENT LOCUS

CALIBRATION METHOD FOR SURFACE TEXTURE MEASURING INSTRUMENT, CALIBRATION PROGRAM FOR SURFACE TEXTURE MEASURING INSTRUMENT, RECORDING MEDIUM STORING THE CALIBRATION PROGRAM AND SURFACE TEXTURE MEASURING INSTRUMENT

BACKGROUND

The present invention relates to a calibration method for a surface texture measuring instrument, a calibration program for a surface texture measuring instrument, a recording medium storing the calibration program and a surface texture measuring instrument.

Conventionally, there has been known a surface texture measuring instrument for measuring surface texture of a workpiece such as surface roughness, waviness, contour, roundness and straightness.

SUMMARY

A surface texture measuring instrument 1 shown in FIG. 1 has an arm 3 with a base end 311 swingably supported, a contact point 41 that is arranged on the other end of the arm 3 for scanning on a workpiece, a first detector 6 for detecting a displacement of the arm 3 in x-direction and a second detector 7 for detecting the swing of the arm 3 as a displacement in z-direction.

The first detector 6 and the second detector 7 are not designed to directly detect the coordinates of the contact point 41. When the arm 3 moves in an arc, this circular movement causes a deviation undetectable by a displacement detector such as the first detector 6 and the second detector 7. Therefore, in a method applied for obtaining measurement data of the workpiece surface by calculating the coordinate of the contact point 41, the deviation of x-coordinate caused by the circular movement of the arm 3 is defined as dx and that of z-coordinate is defined as dz, and these dx and dz are counted in detection results of the first detector 6 and the second detector 7.

It is needles to mention that an accurate surface texture measurement requires correct estimation of the deviation dx and dz due to the circular movement of the arm 3. Incorrect estimation of the deviations causes a measurement error (symmetry error) which is a measurement value difference between a workpiece surface measured as an ascending surface and the same surface measured as a descending surface. To overcome such problem, methods for calibrating the estimation of the deviation have been proposed (see Reference 1 Examined Japanese Patent Application Publication No. 3215354, Reference 2: Examined Japanese Patent Application Publication No. 3215325, and Reference 3: Examined Japanese Patent Application Publication No. 2727067).

For instance, according to methods disclosed in Reference 1 and Reference 2, a gauge with a known height is measured to calibrate the deviation in z-direction. Then, a gauge with a known angle or a spherical gauge is measured to calibrate a symmetry error. However, the z-direction calibration and the subsequent symmetry calibration require considerable time and certain skill since the replacement of reference gauge is necessary in the measurements. Moreover, it is troublesome to set gauges one after another for measuring a plurality of gauges.

In view of these problems, a method proposed in Reference 3, includes a step for measuring a gauge which can be regarded as a substantially perfect circle one time and a step for applying a least-square method that assigns the measurement data in a circle equation, thus enabling a calibration with one measurement and calculation. However in Reference 3, since a parameter subjected to the calibration is limited, it is impossible to perform calibration more accurately.

Meanwhile, the recent progress of surface processing technique and its importance increase the demand for a highly accurate calibration method for a surface texture measuring instrument.

An object of the present invention is to provide a calibration method for a surface texture measuring instrument for easily and highly accurately calibrating a surface texture measuring instrument, its calibration program, a recording medium storing the calibration program and a surface texture measuring instrument.

According to an aspect of the present invention, a calibration method for a surface texture measuring instrument that measures a surface of a workpiece, the instrument including: an arm supported to be swingable around a base point; a stylus that is arranged on an end of the arm and is provided with a contact point on a tip thereof, the contact point being in contact or nearly in contact with the workpiece along a substantial tangent line of an arc drawn by a tip of the contact point in accordance with a swing of the arm; a shifter for shifting the arm in x-direction while keeping the contact point in contact or nearly in contact with the workpiece surface; a first detector for detecting a displacement of the base point in the x-direction; a second detector for detecting a displacement in z-direction due to the swing of the arm based on a displacement of a point on the arm in the z-direction; and a compensation computing unit that compensates detection results of the first detector and the second detector for a deviation due to the swing to obtain measurement data of the workpiece surface, includes: a measurement step for measuring a calibration gauge of which cross section contains a part of a substantially perfect circle; an assignment step for assigning the detection results of the first detector and the second detector, which are obtained in the measurement step, in an evaluation formula based on a circle equation in which the center coordinates of the calibration gauge are $(x_c, z_c)$ and a radius of the calibration gauge is "r"; and a calibration step for calibrating gain of z-coordinate of the tip of the contact point relative to the detection result of the second detector and each parameter included in the deviation based on the results obtained in the assignment step.

With this configuration, the calibration gauge is measured to obtain measurement data in the measurement step. Since the calibration gauge has a cross section containing a part of a substantially perfect circle and the data for the perfect circle must satisfy the circle equation, the surface texture measuring instrument can be conversely calibrated by calibrating each parameter to satisfy the circle equation. Therefore, in the assignment step, the data obtained in the measurement step is assigned in the evaluation formula based on the circle equation. Then, each parameter is calibrated by, for example, a least square method in the calibration step.

In the calibration step, the least square method may be applied selectively to a plurality of parameters subjected to calibration.

With this configuration, the gain of z-coordinate of the tip of the contact point to the detection result of the second detector can be found together. While it is necessary in conventional methods to measure a gauge with a known height to calibrate z-direction deviation, and subsequently to replace with a spherical calibration gauge to calibrate symmetry and the like, the measurement step with this configuration only requires to measure a spherical gauge one time. Therefore, as compared to measurements of a plurality of calibration gauges for each parameter subjected to calibration, this method is convenient and requires less time. If it is configured to automatically calibrate all the parameters subjected to calibration with the use of, for example, the least square method based on the data obtained in the measurement step, there is no need for an operator to replace the calibration gauge. Accordingly, after setting the calibration gauge, the operator need not stay by the surface texture measuring instrument, thereby making the operator free from troublesome work.

In methods requiring replacement of calibration gauges, errors in the setting might cause calibration errors. Meanwhile, in this invention, since correct setting of the calibration gauge is required only one time, the risk to cause setting errors can be minimized and consequently accuracy of the calibration can be enhanced.

In the calibration method for the surface texture measuring instrument according to the present invention, it is preferable that the evaluation formula in the assignment step is determined based on: an arm reference length L as a length from the base point to a reference point as a foot of a perpendicular line extended from the tip of the contact point to a base shaft of the arm extending in longitudinal direction; a detection value $x_i$ of the first detector; a detection result $z_i$ of the second detector; a gain "g" of the z-coordinate of the tip of the contact point to the detection result $z_i$ of the second detector; and a tip compensation amount "h" as a length from the reference point to the tip of the contact point, and with a known arm reference length L being given, the center coordinates ($x_c$, $z_c$), the radius "r", the gain "g" and the tip compensation amount "h" are found in the calibration step.

The evaluation formula may be, for example, the following formula.

$$fi = \sqrt{\left\{x_i + L\left(1 - \frac{\sqrt{L^2 - (gz_i)^2}}{L}\right) - h\frac{gz_i}{L} - x_C\right\}^2 + \left\{gz_i + h\left(1 - \frac{\sqrt{L^2 - (gz_i)^2}}{L}\right) - z_C\right\}^2} - r \quad (1)$$

The calibration method for the surface texture measuring instrument according to the present invention, it is preferable that, based on a designed value of the arm reference length L, the center coordinates ($x_c$, $z_c$), the radius "r", the gain "g", and the tip compensation amount "h" are found in the calibration step.

The evaluation formula may be, for example, the following formula.

$$fi = \sqrt{\left\{x_i + L\left(1 - \frac{\sqrt{L^2 - (gz_i)^2}}{L}\right) - h\frac{gz_i}{L} - x_C\right\}^2 + \left\{gz_i + h\left(1 - \frac{\sqrt{L^2 - (gz_i)^2}}{L}\right) - z_C\right\}^2} - r \quad (2)$$

The calibration method for the surface texture measuring instrument according to the present invention, it is preferable that the evaluation formula in the assignment step is determined based on: an arm reference length L as a length from the base point to the tip of the contact point; a detection value $x_i$ of the first detector; a detection result $z_i$ of the second detector; a gain "g" of the z-coordinate of the tip of the contact point to the detection result $z_i$ of the second detector; and a zeroset deviation $z_0$ as a value derived by multiplying the detection result of the second detector, which is obtained when a line connecting the base point and the tip of the contact point tip is parallel to the x-direction, by the gain "g", and that the center coordinates ($x_c$, $z_c$) of the circle, the radius of the circle "r", the gain "g", the arm reference length L and the zeroset deviation $z_0$ are found.

The evaluation formula may be, for example, the following formula.

$$fi = \sqrt{\left\{x_i + L\left(1 - \frac{\sqrt{L^2 - (gz_i - z_O)^2}}{L}\right) - x_C\right\}^2 + (gz_i - z_C)^2} - r \quad (3)$$

The calibration method for the surface texture measuring instrument according to the present invention, it is preferable that the evaluation formula in the assignment step is determined based on: an arm reference length L as a length from the base point to a reference point as a foot of a perpendicular line extended from the tip of the contact point to a base shaft of the arm extending in longitudinal direction; a detection value $x_i$ of the first detector; detection result $z_i$ of the second detector; a gain "g" of the z-coordinate of the tip of the contact point to the detection result $z_i$ of the second detector; a tip compensation amount "h" as a length from the reference point to the tip of the contact point; and a zeroset deviation $z_0$ as a value derived by multiplying the detection result of the second detector, which is obtained when the base shaft of the arm is parallel to the x-direction, by the gain "g", and that the center coordinates ($x_c$, $z_c$) of the circle, the radius of the circle "r", the tip compensation amount "h", the gain "g", the zeroset deviation $z_0$ and the arm reference length L are found.

The evaluation formula may be, for example, the following formula.

$$fi = \sqrt{\left\{x_i + L\left(1 - \frac{\sqrt{L^2 - (gz_i - z_O)^2}}{L}\right) - h\frac{(gz_i - z_O)}{L} - x_C\right\}^2 + \left\{gz_i + h\left(1 - \frac{\sqrt{L^2 - (gz_i - z_O)^2}}{L}\right) - z_C\right\}^2} - r \quad (4)$$

With this configuration, the gain "g", the tip compensation amount "h", the zeroset deviation $z_0$, the arm reference length L and the like can be calibrated. Since these parameters are calibrated based on the data obtained in the single measurement in the measurement step, this method is convenient and the calibration can be performed in a short time.

The calibration method for the surface texture measuring instrument according to the present invention preferably further includes a second calibration step, with a true shape of the calibration gauge being given, for computing a tip shape of the contact point based on difference from the radius "r" found in the calibration step.

According to this configuration, since the true shape of the calibration gauge is given, the tip shape of the contact point can be found based on the difference from the radius "r" found in the calibration step. Although the shape of the calibration gauge and the tip shape of the contact point are typically spherical, they are not exactly perfect sphere. Also, lengths from the nominal center ($x_c$, $z_c$) of the sphere to the sphere surface in each angle direction are not necessarily the same. Therefore, the lengths from the nominal center of the calibration gauge to the sphere surface in each angle direction are measured in advance. Then the lengths in each angle direction corresponding to the detection results in the measurement step are calculated and the difference from the radius "r" found in the calibration step is found. In this way, even when the calibration gauge is not perfect sphere, accurate calibration calculation can be performed.

Similarly, as for the tip shape of the contact point, based on the angle corresponding to the detection result in the measurement step (measurement orientation of contact section and the like of the contact point with the calibration gauge seen from the nominal center of the contact point) and the true shape of the calibration gauge, the length from the nominal center of the contact point to the surface of the contact point at the corresponding angle (measurement orientation) can be found (The distance is found as the difference between the radius "r" at each angle found in the calibration step and the length of a corresponding section of the calibration gauge). Accordingly, if a specific area of the spherical calibration gauge is measured and the contact point is measured at each measurement orientation, the lengths at each measurement orientation can be found and therefore the tip shape of the contact point can be found.

The calibration method for the surface texture measuring instrument according to the present invention, it is preferable that the calibration gauge contains at least a part of a perfect circle and the true shape of the calibration gauge is represented by a radius "rt" of the perfect circle.

The part of a perfect circle indicates that, for example, in the case that the calibration gauge contains perfect spherical part and the perfect spherical part is measured in the measurement step, the measured cross section defines a part of a perfect circle.

According to this configuration, when a portion of the calibration gauge measured in the measurement step is a perfect circle, the tip radius of the contact point can be found based on the difference between the radius "r" found with the evaluation formula and the radius "rt", and hence the calculation is simplified.

The calibration method for the surface texture measuring instrument according to the present invention, it is preferable that the tip shape of the contact point contains at least a part of a perfect circle and is represented by the radius of the perfect circle.

The part of a perfect circle indicates that, for example, in the case that the tip shape of the contact point contains perfect spherical part and the calibration gauge is measured by the perfect spherical part in the measurement step, a measurement portion of the contact point defines a part of a perfect circle.

According to this configuration, when the calibration gauge is measured in the measurement step in a condition that the measurement portion of the contact point is perfect circle, the tip radius of the contact point can be easily found based on the radius "r" found with the evaluation formula, and hence the calculation is simplified.

When both of the measured cross section of the calibration gauge and a cross section of the measurement portion are perfect circles, the tip radius of the contact point can be found base on the difference from the radius "r" found in the calibration step more easily. Specifically, since the radius "r" is computed as length from a center of an arc of the tip of the contact point to a center of an arc of the reference gauge, the tip radius of the contact point can be found by subtracting a true radius "rt" of the calibration gauge from the radius "r".

The above-described calibration method has no need to replace the reference gauge, excels in convenience, requires less measurement time and less preparation work, eliminates setting errors caused by the replacement of the reference gauge and hence offers accurate calibration, since the tip shape of the contact point is found based on the data obtained in the single measurement in the measurement step.

In a calibration program for a surface texture measuring instrument according to another aspect of the present invention, a computer executes the above-described calibration methods for the surface measuring instrument of the present invention. For example, a computer is embedded in a surface texture measuring instrument that measures a surface of a workpiece, the instrument including: an arm supported to be swingable around a base point; a stylus that is arranged on an end of the arm and is provided with a contact point on a tip thereof, the contact point being in contact or nearly in contact with the workpiece along a substantial tangent line of an arc drawn by a swing of the arm; a shifter for shifting the arm in x-direction while keeping the contact point in contact or nearly in contact with the workpiece surface; a first detector for detecting a displacement of the base point in the x-direction; a second detector for detecting a linear displacement in z-direction due to the swing of the arm based on a displacement of a point on the arm in the z-direction; and a compensation computing unit that compensates detection results of the first detector and the second detector for a deviation due to the swing to obtain measurement data of the workpiece surface, so that the computer executes: a measurement step for measuring a calibration gauge of which cross section contains a part of a substantially perfect circle; an assignment step for assigning the detection results of the first detector and the second detector, which are obtained in the measurement step, in an evaluation formula based on a circle equation in which the center coordinates are ($x_c$, $z_c$) and a radius of the calibration gauge is "r"; and a calibration step for calibrating each parameter included in the deviation based on the evaluation formula obtained in the assignment step.

Each parameter is, for example, calibrated by applying the least square method to the evaluation formula.

According to a further aspect of the present invention, a computer-readable recording medium stores the above-described calibration program of the present invention for a surface texture measuring instrument. For example, the recording medium stores a calibration program for a surface texture measuring instrument in which a computer is embedded, the instrument measures a surface of a workpiece and includes: an arm supported to be swingable around a base point; a stylus that is arranged on an end of the arm and is provided with a contact point on a tip thereof, the contact point being in contact or nearly in contact with the workpiece along a substantial tangent line of an arc drawn by a swing of the arm; a shifter for shifting the arm in x-direction while keeping the contact point in contact or nearly in contact with the workpiece surface; a first detector for detecting a displacement of the base point in the x-direction; a second detector for detecting a linear displacement in z-direction due to the swing of the arm based on a displacement of a point on the arm in the z-direction; and a compensation computing unit that compensates detection results of the first detector and the second detector for a deviation due to the swing to obtain measurement data of the workpiece surface so that the computer executes: a measurement step for measuring a calibration gauge of which cross section contains a part of a substantially perfect circle; an assignment step for assigning the detection results of the first detector and the second detector, which are obtained in the measurement step, in an evaluation formula based on a circle equation in which the center coordinates are ($x_c$, $z_c$) and a radius of the calibration gauge is "r"; and a calibration step for calibrating each parameter included in the deviation based on the evaluation formula obtained in the assignment step.

Each parameter is, for example, calibrated by applying the least square method to the evaluation formula.

A surface texture measuring instrument according to a still further aspect of the present invention, includes the above-described calibration program of the present invention for a surface texture measuring instrument.

According to this configuration, the same advantages in any one of the above aspects of the present invention can be obtained. Further, if a computer having a CPU (Central Processing Unit) and a memory (storage unit) is built in the surface texture measuring instrument while arranging a program so that a computer executes each step, the parameters subjected to calibration, for example, can be easily changed in the calibration process. The program may be stored in a recording medium and be installed in a computer by directly inserting the recording medium to the computer, or alternatively, a reader device may be externally attached to the computer to install the program in the computer through the reader device. The program may be supplied and installed to the computer wirelessly or through a communication line such as the Internet, LAN cable and telephone line.

DETAILED DESCRIPTION OF PREFERRED EMBODIMENTS

[Configuration of Surface Texture Measuring Instrument]

The following description is configuration of a surface texture measuring instrument 1 that is subjected to calibration with the use of a calibration method for a surface texture measuring instrument of the present invention.

Figure 1:
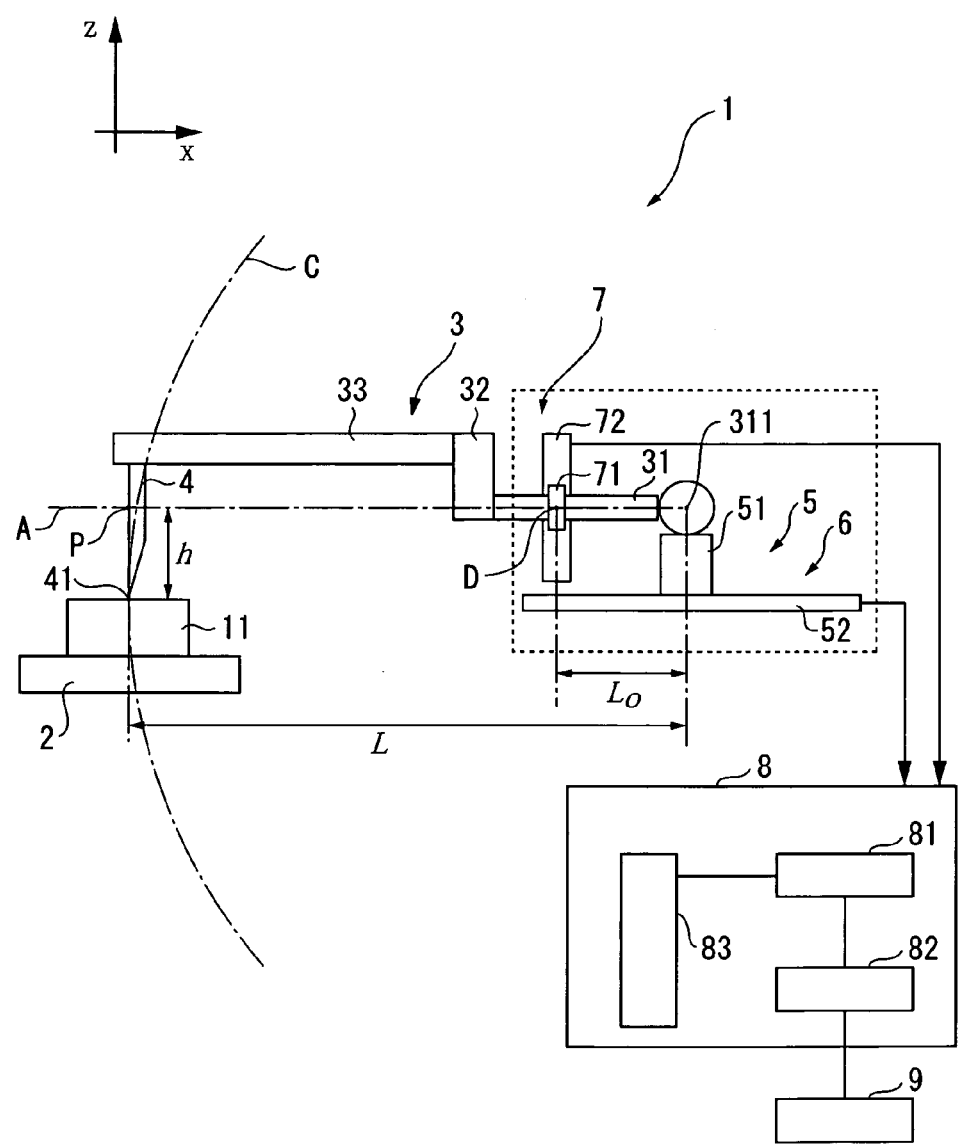
FIG. 1 is an illustration showing configuration of a surface texture measuring instrument.

Referring to FIG. 1, the surface texture measuring instrument 1 includes a stage 2 on which a workpiece 11 is placed, an arm 3 supported to be swingable around a base point 311, a stylus 4 that is arranged on an end of the arm 3 and is provided with a contact point 41 on a tip thereof to contact the workpiece 11 along a substantial tangent line of an arc C formed by the swing, a shifter 5 for shifting the arm 3 in x-direction while keeping the contact point 41 in contact with the workpiece surface, a first detector 6 for detecting a displacement of the base point 311 in the x-direction, a second detector 7 for detecting a displacement in the z-direction due to the swing of the arm 3 based on a displacement of a middle point D of the arm 3 in the z-direction, a compensation computing unit 8 that compensates detection results of the first detector 6 and the second detector 7 for a deviation due to the swing of the arm 3 to obtain measurement data of the workpiece surface, and a display 9 as an output unit for outputting a result computed by the compensation computing unit 8.

Figure 2:
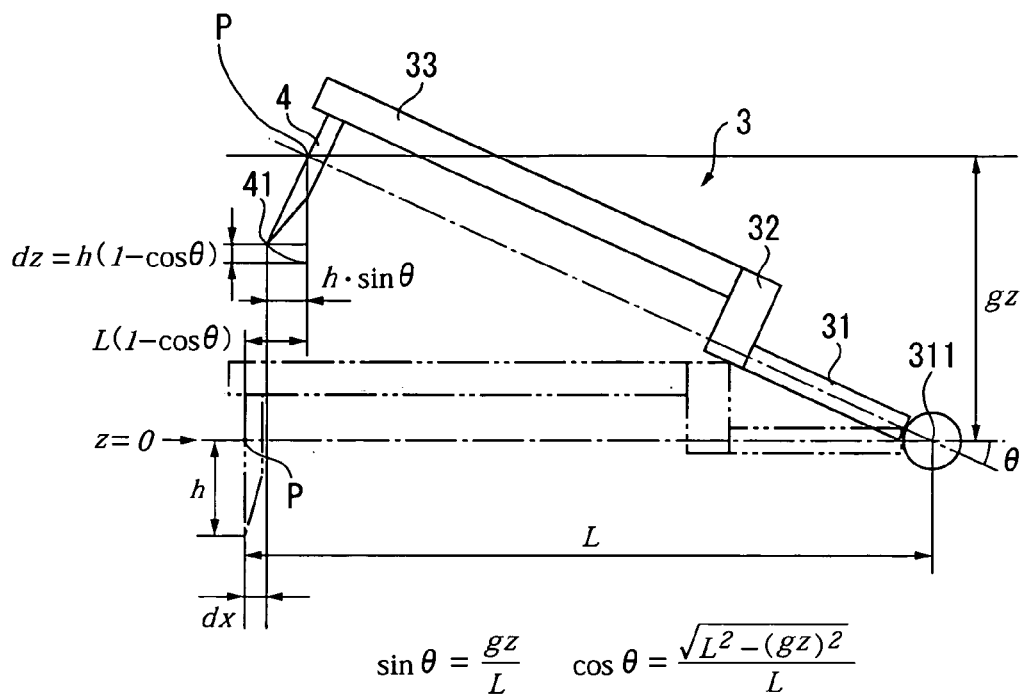
FIG. 2 is an illustration showing a geometric relation of a deviation due to a circular movement of an arm in a first embodiment according to a calibration method for the surface texture measuring instrument of the present invention.

The arm 3 as shown in FIG. 2, includes a base shaft section 31 swingably supported at the base point 311 as a supporting point and an arm section 33 that is parallel to but slightly deviated from a base line A along the direction of the base shaft of the base shaft section 31 and is formed integrally with the base shaft section 31 through a joint 32 which is orthogonal to the base line A.

The stylus 4 is formed at the other end opposite to a base end of the arm section 33 to be generally at right angle to the arm section 33. On the tip of the stylus 4, the contact point 41 is provided to contact the workpiece 11. In other words, the stylus 4 is provided in a direction of a circumference of the arc C drawn by the tip of the contact point 41 that moves as the arm 3 swings, and the contact point 41 is so arranged to contact the workpiece 11 along from the direction of a tangent line of the arc C at the other end of the arm section 33.

The shifter 5 includes an x-slider 51 for swingably supporting the base shaft section 31 and an x-guide shaft 52 for guiding the x-slider 51 in the x-direction (see FIG. 1). The x-direction is a direction for scanning the workpiece surface. This direction is included within at least the swing plane of the arm 3 and same with the direction of the base line of the base shaft section 31 when the swing angle of the arm 3 is zero The first detector 6 is designed to detect displacement of the base point 311 of the arm 3 based on displacement of the x-slider 51 and may be an encoder of photoelectric type, an electric capacitance type, or a magnetic type that detects, for instance, shift distance of the x-slider 51 along the x-guide shaft 52.

The second detector 7 is designed to detect z-direction displacement of the middle point D at the middle point D of the base shaft section 31 and may be an encoder having, for instance, a movable electrode 71 that moves integrally with the middle point D and a scale 72 that is arranged parallel to the swing plane of the arm 3 and perpendicular to the x-direction for detecting z-direction displacement of the movable electrode 71. Here, the z-direction is a direction perpendicular to the x-direction and is included at least within the swing plane of the arm 3.

The compensation computing unit 8 includes a memory 81 storing a predetermined parameter and a computing section 82 for performing computation according to a predetermined computation formula, and calculates measurement data of the workpiece surface based on the detection results of the first detector 6 and the second detector 7. The compensation computing unit 8 also includes a calibration computing section 83, of which operation will be described later, for calibrating each parameter for the memory 81.

The compensation computing unit 8 obtains the measurement data of the workpiece surface from the detection results of the first detector 6 and the second detector 7 in a following way.

First, a reference point P is set for setting a reference length L of the arm 3. Herein, the reference point P is set at a foot of a perpendicular line extended from the tip of the contact point 41 to the base line A, which is the base shaft of the arm 3, and the arm reference length L is set as the length from the base point 311 (a swing center) to the reference point P in the direction of the base shaft of the arm 3. Under such conditions, when the swing angle of the arm 3 is zero, the x-coordinate (the uncompensated x-coordinate) of the reference point P is the same as the detection result of the first detector 6.

When the detection value of the second detector 7 is $z_i$, the z-coordinate (the uncompensated z-coordinate) can be calculated with (the detection value $z_i$ of the second detector)× (the arm reference length L)/(the length Lo from the base point to the middle point), where Lo is the length from the base point 311 to the middle point D (a detection point of the second detector). Accordingly, when the detection value of the second detector 7 is $z_i$, the z-coordinates of the reference point P can be found as $gz_i$ by using a predetermined gain "g".

In this way, the x-coordinate (the uncompensated x-coordinate) of the reference point P with the swing angle of the arm 3 being zero is found based on the detection result of the first detector 6, and the $gz_i$ (the uncompensated z-coordinate) as the z-coordinate of the reference point P with the detection result of the second detector 7 being $z_i$ is found. However, since the coordinates of the contact point 41 are obviously deviated from the uncompensated x-coordinate and the uncompensated z-coordinate, it is necessary to find compensation amount for each of the x-coordinate and the y-coordinate for compensating for these deviations at the next step.

Herein, the length from the reference point P to the tip of the contact point 41 is tip compensation amount "h". When the swing angle of the arm 3 is θ, the detection value of the second detector 7 is $z_i$. Under such conditions, based on the geometric relation shown in FIG. 2, with the swing angle of the arm 3 being θ, the deviation (the x-direction compensation amount) between the x-coordinate of the contact point 41 and the uncompensated x-coordinate is represented by the following formula.

$$dx = L(1-\cos\theta) - h \cdot \sin\theta = L\left(1 - \frac{\sqrt{L^2 - (gz_i)^2}}{L}\right) - h\frac{gz_i}{L} \quad (5)$$

The deviation (the z-direction compensation amount) between the z-coordinate of the contact point 41 and the uncompensated z-coordinate is represented by the following formula.

$$dz = h(1-\cos\theta) = h\left(1 - \frac{\sqrt{L^2 - (gz_i)^2}}{L}\right) \quad (6)$$

Accordingly, the reference point P is found based in the detection results of the first detector 6 and the second detector 7 and then the deviations derived from the above formulas (5) and (6) are counted in, so that the coordinates of the contact point 41 are found.

The memory 81 of the compensation computing unit 8 stores an arm reference length L, a gain "g", and a tip compensation amount "h" which are set as default. Otherwise, the memory 81 stores arm reference length L, predetermined gain "g", tip compensation amount "h" which are calibrated in a previous calibration. The computing section 82 performs the computation of the formulas (5) and (6) using the detection results of the first detector 6 and the second detector 7 and the parameters stored in the memory 81 to find the coordinates of the contact point 41.

Then, the computing section 82 counts the tip radius of the contact point 41, the contact angle of the contact point to the workpiece surface, and the z-coordinate of the reference point P with the base shaft of the arm 3 (the base line A) being parallel to the x-direction (or, zeroset deviation which is the value derived by multiplying the detection result of the second detector 7 by the gain "g" in this condition) in the detection results to obtain the measurement data of the workpiece surface.

The following is a description of surface texture measurement of the workpiece 11. In measuring the surface texture of the workpiece 11, the workpiece 11 is placed on the stage 2, and the workpiece surface is contacted by the contact point 41. The shifter 5 shifts the arm 3 in the x-direction while the first detector 6 and the second detector 7 perform detection at every predetermined shift distance interval in the x-direciton. The detection results of the first detector 6 and the second detector 7 are sent to the compensation computing unit 8, so that the computing section 82 performs the computation to find the measurement data of the workpiece surface. The measurement data is displayed on the display 9 to find the surface texture of the workpiece surface.

[Calibration Method of Surface Texture Measuring Instrument]

(First Embodiment)

The following is the description of the calibration method for the surface texture measuring instrument 1 of the present invention.

The calibration method for the surface texture measuring instrument 1 includes a measurement step for measuring a calibration gauge 10 of which cross section contains a part of a substantially perfect circle, an assignment step for assigning the detection results of the first detector 6 and the second detector 7, which are obtained in the measurement step, in an evaluation formula based on a circle equation in which the center coordinates of the perfect circle are $(x_c, z_c)$ and the radius is "r", and a calibration step for applying least square method to the evaluation formula obtained in the assignment step to calibrate each parameter included in the deviation.

Figure 3:
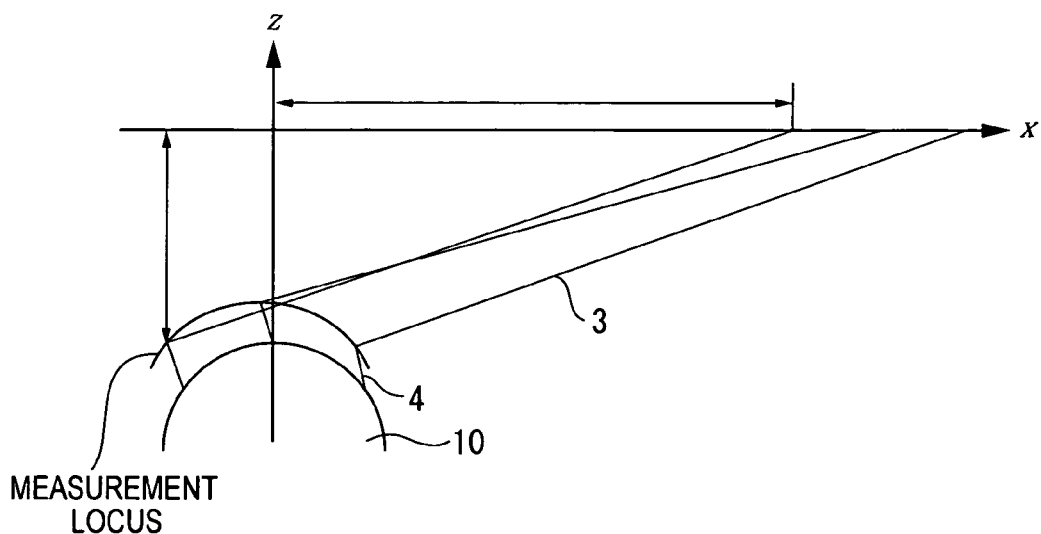
FIG. 3 is an illustration showing a measurement of a calibration gauge.

In the measurement step, as shown in FIG. 3, a measurement is performed on a calibration gauge 10 of which cross section taken parallel to the x-direction can be regarded as a perfect circle. The detection results of the first detector 6 and the second detector 7 in the measurement step as calibration data sent to and stored in the calibration computing section 83.

Then, the calibration computing section 83 assigns the stored calibration data in the evaluation formula based on the circle equation (the assignment step).

In the assignment in the evaluation formula, the surface coordinates of the calibration gauge 10 resulted from the compensation computation of the computing section 82 may be assigned. However, if simplification as described below is included, calculation load can be reduced in the subsequent calibration step.

As for the tip radius of the contact point 41, when the tip section of the contact point 41 is regarded as a perfect sphere, only the radius of the contact point 41 offsets against the radius of the calibration gauge 10. Therefore, the circle equitation is satisfied without counting the radius of the contact point 41 in the calibration data. For this reason, when the calibration data is assigned in the evaluation formula, the radius of the contact point 41 will not be counted in.

Based on the above, in assigning the detection results of the first detector 6 and the second detector 7 in the evaluation formula, the value of the x-coordinate is $X_i$ which is found by counting the deviation dx due to the swing of the arm 3 (see the formula (5)) in the detection result $x_i$ of the first detector 6. The value of the z-coordinate is $Z_i$ which is found by counting the deviation dz due to the swing of the arm 3 (see the formula (6)) in the z-coordinate $gz_i$ of the reference point P.

$$X_i = x_i + L\left(1 - \frac{\sqrt{L^2 - (gz_i)^2}}{L}\right) - h\frac{gz_i}{L} \quad (7)$$

$$Z_i = gz_i + h\left(1 - \frac{\sqrt{L^2 - (gz_i)^2}}{L}\right)$$

Then the center coordinates of the calibration gauge 10 ($x_c$, $z_c$) and the radius "r" are assigned in the following formula as arbitrary variables.

$$fi = \sqrt{(X_i - x_C)^2 + (Z_i - z_C)^2} - r \quad (8)$$

$$= \sqrt{\left\{x_i + L\left(1 - \frac{\sqrt{L^2 - (gz_i)^2}}{L}\right) - h\frac{gz_i}{L} - x_C\right\}^2 + \left\{gz_i + h\left(1 - \frac{\sqrt{L^2 - (gz_i)^2}}{L}\right) - z_C\right\}^2} - r$$

In the calibration step, the least square method is applied to the above evaluation formula (8). Herein, in applying the least square method, the center coordinates ($x_c$, $z_c$), the radius "r", the gain "g", and the tip compensation amount "h" are subjected to the calibration.

That is, each of the above parameters for minimizing "s" are found, where "s" is the sum of square of the evaluation formula $f_i$. The calculation formula of the least square method is the formula below.

$$\begin{bmatrix} \sum\left(\frac{\partial f_i}{\partial x_C}\right)^2 & \sum\left(\frac{\partial f_i}{\partial x_C}\cdot\frac{\partial f_i}{\partial z_C}\right) & \sum\left(\frac{\partial f_i}{\partial x_C}\cdot\frac{\partial f_i}{\partial g}\right) & \sum\left(\frac{\partial f_i}{\partial x_C}\cdot\frac{\partial f_i}{\partial h}\right) & \sum\left(\frac{\partial f_i}{\partial x_C}\cdot\frac{\partial f_i}{\partial r}\right) \\ \sum\left(\frac{\partial f_i}{\partial z_C}\cdot\frac{\partial f_i}{\partial x_C}\right) & \sum\left(\frac{\partial f_i}{\partial z_C}\right)^2 & \sum\left(\frac{\partial f_i}{\partial z_C}\cdot\frac{\partial f_i}{\partial g}\right) & \sum\left(\frac{\partial f_i}{\partial z_C}\cdot\frac{\partial f_i}{\partial h}\right) & \sum\left(\frac{\partial f_i}{\partial z_C}\cdot\frac{\partial f_i}{\partial r}\right) \\ \sum\left(\frac{\partial f_i}{\partial g}\cdot\frac{\partial f_i}{\partial x_C}\right) & \sum\left(\frac{\partial f_i}{\partial g}\cdot\frac{\partial f_i}{\partial z_C}\right) & \sum\left(\frac{\partial f_i}{\partial g}\right)^2 & \sum\left(\frac{\partial f_i}{\partial g}\cdot\frac{\partial f_i}{\partial h}\right) & \sum\left(\frac{\partial f_i}{\partial g}\cdot\frac{\partial f_i}{\partial r}\right) \\ \sum\left(\frac{\partial f_i}{\partial h}\cdot\frac{\partial f_i}{\partial x_C}\right) & \sum\left(\frac{\partial f_i}{\partial h}\cdot\frac{\partial f_i}{\partial z_C}\right) & \sum\left(\frac{\partial f_i}{\partial h}\cdot\frac{\partial f_i}{\partial g}\right) & \sum\left(\frac{\partial f_i}{\partial h}\right)^2 & \sum\left(\frac{\partial f_i}{\partial h}\cdot\frac{\partial f_i}{\partial r}\right) \\ \sum\left(\frac{\partial f_i}{\partial r}\cdot\frac{\partial f_i}{\partial x_C}\right) & \sum\left(\frac{\partial f_i}{\partial r}\cdot\frac{\partial f_i}{\partial z_C}\right) & \sum\left(\frac{\partial f_i}{\partial r}\cdot\frac{\partial f_i}{\partial g}\right) & \sum\left(\frac{\partial f_i}{\partial r}\cdot\frac{\partial f_i}{\partial h}\right) & \sum\left(\frac{\partial f_i}{\partial r}\right)^2 \end{bmatrix} \quad (9)$$

$$\begin{bmatrix} \Delta x_C \\ \Delta z_C \\ \Delta g \\ \Delta h \\ \Delta r \end{bmatrix} = \begin{bmatrix} \sum\left(fo\cdot\frac{\partial f_i}{\partial x_C}\right) \\ \sum\left(fo\cdot\frac{\partial f_i}{\partial z_C}\right) \\ \sum\left(fo\cdot\frac{\partial f_i}{\partial g}\right) \\ \sum\left(fo\cdot\frac{\partial f_i}{\partial h}\right) \\ \sum\left(fo\cdot\frac{\partial f_i}{\partial r}\right) \end{bmatrix}$$

The result can be obtained by adding the calculation results of the above formula (9), $\Delta x_c$, $\Delta z_c$, $\Delta g$, ... $\Delta r$ to default values of each parameter. The calculation may be repeated to make the resulted value of the above formula small enough to improve the calculation accuracy.

Thereafter, each parameter stored in the memory 8 is calibrated based on the calculation result obtained with the use of the least square method in the calibration step. Then, the calibrated parameters are applied to the detection values of the first detector and the second detector, so that the measurement result of the workpiece surface is obtained at the computing section 82.

According to the first embodiment with such configuration, the following advantages can be obtained.

Since the calibration gauge 10 of which cross section can be regarded as a substantially perfect circle is measured and the least square method based on the circle equation is applied to this measurement result, a plurality of parameters can be calibrated with one measurement. That is, the calibration is simple since it is unnecessary to perform the measurement and the calibration computation for calibrating the gain "g" and further perform the measurement and the calibration computation for calibrating the tip compensation amount "h". In addition, since the calibration requires only one calibration gauge 10, the cost can be reduced.

Since the calibration is simple, measurements can be performed by a surface texture measuring instrument which is always correctly calibrated. Specifically, the calibrated surface texture measuring instrument can accurately measure the workpiece surface avoiding a symmetry error which is a measurement value difference between a workpiece surface measured in pulse x-direction (an ascending direction) and the same surface measured in minus x-direction (a descending direction) Since there is no need to replace the calibration gauge, accurate calibration can be performed without setting errors of the calibration gauge.

(Second Embodiment)

The following is the description of a second embodiment of the present invention. Although the basic configuration in the second embodiment is the same as in the first embodiment, the second embodiment is characterized in that the arm reference length L is also subjected to the calibration in addition to those subjected to the calibration in the first embodiment in applying the least square method.

That is, the following least square method calculation is applied to the evaluation formula (8).

(Third Embodiment)

The following is the description of a third embodiment of the present invention. Although the basic configuration in the third embodiment is the same as in the first embodiment, the third embodiment is characterized in that the arm reference length L and the zeroset deviation $z_0$ are also subjected to the calibration in addition to those subjected to the calibration in the first embodiment.

Figure 4:
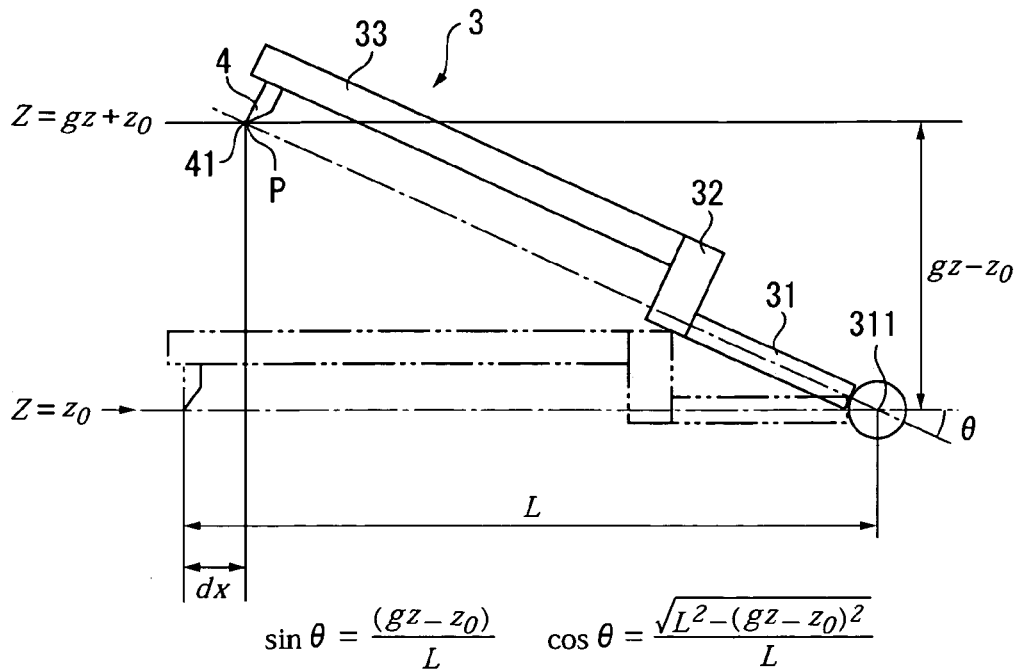
FIG. 4 is an illustration showing a geometric relation of a deviation due to a circular movement of an arm in a third embodiment according to a calibration method for the surface texture measuring instrument of the present invention.

In the surface texture measuring instrument 1 in the third embodiment, as shown in FIG. 4, the contact point 41 is arranged to generally match the reference point. In other words, the tip compensation amount "h" is approximately zero, and the deviation due to the swing of the arm 3 is represented by the below formula that corresponds to the formulas (5) and (6). In calculating the x-direction deviation, the zero set deviation of the second detector is counted in.

Herein, the zeroset deviation $Z_0$ is the value of the z-coordinate of the contact point 41 (the reference point P) with the base shaft of the arm 3 (the base line A) being parallel to the x-direction (or, the value derived by multiplying the detection result of the second detector 7 by the gain "g" in this condition).

$$\begin{bmatrix} \sum\left(\frac{\partial f_i}{\partial x_C}\right)^2 & \sum\left(\frac{\partial f_i}{\partial x_C}\cdot\frac{\partial f_i}{\partial z_C}\right) & \sum\left(\frac{\partial f_i}{\partial x_C}\cdot\frac{\partial f_i}{\partial g}\right) & \sum\left(\frac{\partial f_i}{\partial x_C}\cdot\frac{\partial f_i}{\partial h}\right) & \sum\left(\frac{\partial f_i}{\partial x_C}\cdot\frac{\partial f_i}{\partial L}\right) & \sum\left(\frac{\partial f_i}{\partial x_C}\cdot\frac{\partial f_i}{\partial r}\right) \\ \sum\left(\frac{\partial f_i}{\partial z_C}\cdot\frac{\partial f_i}{\partial x_C}\right) & \sum\left(\frac{\partial f_i}{\partial z_C}\right)^2 & \sum\left(\frac{\partial f_i}{\partial z_C}\cdot\frac{\partial f_i}{\partial g}\right) & \sum\left(\frac{\partial f_i}{\partial z_C}\cdot\frac{\partial f_i}{\partial h}\right) & \sum\left(\frac{\partial f_i}{\partial z_C}\cdot\frac{\partial f_i}{\partial L}\right) & \sum\left(\frac{\partial f_i}{\partial z_C}\cdot\frac{\partial f_i}{\partial r}\right) \\ \sum\left(\frac{\partial f_i}{\partial g}\cdot\frac{\partial f_i}{\partial x_C}\right) & \sum\left(\frac{\partial f_i}{\partial g}\cdot\frac{\partial f_i}{\partial z_C}\right) & \sum\left(\frac{\partial f_i}{\partial g}\right)^2 & \sum\left(\frac{\partial f_i}{\partial g}\cdot\frac{\partial f_i}{\partial h}\right) & \sum\left(\frac{\partial f_i}{\partial g}\cdot\frac{\partial f_i}{\partial L}\right) & \sum\left(\frac{\partial f_i}{\partial g}\cdot\frac{\partial f_i}{\partial r}\right) \\ \sum\left(\frac{\partial f_i}{\partial h}\cdot\frac{\partial f_i}{\partial x_C}\right) & \sum\left(\frac{\partial f_i}{\partial h}\cdot\frac{\partial f_i}{\partial z_C}\right) & \sum\left(\frac{\partial f_i}{\partial h}\cdot\frac{\partial f_i}{\partial g}\right) & \sum\left(\frac{\partial f_i}{\partial h}\right)^2 & \sum\left(\frac{\partial f_i}{\partial h}\cdot\frac{\partial f_i}{\partial L}\right) & \sum\left(\frac{\partial f_i}{\partial h}\cdot\frac{\partial f_i}{\partial r}\right) \\ \sum\left(\frac{\partial f_i}{\partial L}\cdot\frac{\partial f_i}{\partial x_C}\right) & \sum\left(\frac{\partial f_i}{\partial L}\cdot\frac{\partial f_i}{\partial z_C}\right) & \sum\left(\frac{\partial f_i}{\partial L}\cdot\frac{\partial f_i}{\partial g}\right) & \sum\left(\frac{\partial f_i}{\partial L}\cdot\frac{\partial f_i}{\partial h}\right) & \sum\left(\frac{\partial f_i}{\partial L}\right)^2 & \sum\left(\frac{\partial f_i}{\partial L}\cdot\frac{\partial f_i}{\partial r}\right) \\ \sum\left(\frac{\partial f_i}{\partial r}\cdot\frac{\partial f_i}{\partial x_C}\right) & \sum\left(\frac{\partial f_i}{\partial r}\cdot\frac{\partial f_i}{\partial z_C}\right) & \sum\left(\frac{\partial f_i}{\partial r}\cdot\frac{\partial f_i}{\partial g}\right) & \sum\left(\frac{\partial f_i}{\partial r}\cdot\frac{\partial f_i}{\partial h}\right) & \sum\left(\frac{\partial f_i}{\partial r}\cdot\frac{\partial f_i}{\partial L}\right) & \sum\left(\frac{\partial f_i}{\partial r}\right)^2 \end{bmatrix} \quad (10)$$

$$\begin{bmatrix} \Delta x_C \\ \Delta z_C \\ \Delta g \\ \Delta h \\ \Delta L \\ \Delta r \end{bmatrix} = \begin{bmatrix} \sum\left(f_0\cdot\frac{\partial f_i}{\partial x_C}\right) \\ \sum\left(f_0\cdot\frac{\partial f_i}{\partial z_C}\right) \\ \sum\left(f_0\cdot\frac{\partial f_i}{\partial g}\right) \\ \sum\left(f_0\cdot\frac{\partial f_i}{\partial h}\right) \\ \sum\left(f_0\cdot\frac{\partial f_i}{\partial L}\right) \\ \sum\left(f_0\cdot\frac{\partial f_i}{\partial r}\right) \end{bmatrix}$$

According to the second embodiment, the arm reference length L can be calibrated in addition to the advantages of the first embodiment. With this configuration, the present embodiment allows the calibration of the arm reference length L even when the arm 3 is replaced. The calibration of the arm reference length L further improves the measurement accuracy of the workpiece surface texture.

$$dx = L(1-\cos\theta) = L\left(1 - \frac{\sqrt{L^2 - (gz-z_o)^2}}{L}\right) \quad (11)$$

$$dz = 0$$

In assigning the detection results of the first detector 6 and the second detector 7 in the evaluation formula, the value of the x-coordinate is $X_i$ which is found by counting the deviation dx due to the swing of the swing arm 3 (see the formula (11)) in the detection result $x_i$ of the first detector 6.

That is, each of the above parameters for minimizing "s" are found, where "s" is the sum of square of the evaluation formula $f_i$. The calculation formula of the least square method is the formula below.

$$\begin{bmatrix} \sum\left(\frac{\partial f_i}{\partial x_c}\right)^2 & \sum\left(\frac{\partial f_i}{\partial x_c}\cdot\frac{\partial f_i}{\partial z_c}\right) & \sum\left(\frac{\partial f_i}{\partial x_c}\cdot\frac{\partial f_i}{\partial g}\right) & \sum\left(\frac{\partial f_i}{\partial x_c}\cdot\frac{\partial f_i}{\partial z_o}\right) & \sum\left(\frac{\partial f_i}{\partial x_c}\cdot\frac{\partial f_i}{\partial L}\right) & \sum\left(\frac{\partial f_i}{\partial x_c}\cdot\frac{\partial f_i}{\partial r}\right) \\ \sum\left(\frac{\partial f_i}{\partial z_c}\cdot\frac{\partial f_i}{\partial x_c}\right) & \sum\left(\frac{\partial f_i}{\partial z_c}\right)^2 & \sum\left(\frac{\partial f_i}{\partial z_c}\cdot\frac{\partial f_i}{\partial g}\right) & \sum\left(\frac{\partial f_i}{\partial z_c}\cdot\frac{\partial f_i}{\partial z_o}\right) & \sum\left(\frac{\partial f_i}{\partial z_c}\cdot\frac{\partial f_i}{\partial L}\right) & \sum\left(\frac{\partial f_i}{\partial z_c}\cdot\frac{\partial f_i}{\partial r}\right) \\ \sum\left(\frac{\partial f_i}{\partial g}\cdot\frac{\partial f_i}{\partial x_c}\right) & \sum\left(\frac{\partial f_i}{\partial g}\cdot\frac{\partial f_i}{\partial z_c}\right) & \sum\left(\frac{\partial f_i}{\partial g}\right)^2 & \sum\left(\frac{\partial f_i}{\partial g}\cdot\frac{\partial f_i}{\partial z_o}\right) & \sum\left(\frac{\partial f_i}{\partial g}\cdot\frac{\partial f_i}{\partial L}\right) & \sum\left(\frac{\partial f_i}{\partial g}\cdot\frac{\partial f_i}{\partial r}\right) \\ \sum\left(\frac{\partial f_i}{\partial z_o}\cdot\frac{\partial f_i}{\partial x_c}\right) & \sum\left(\frac{\partial f_i}{\partial z_o}\cdot\frac{\partial f_i}{\partial z_c}\right) & \sum\left(\frac{\partial f_i}{\partial z_o}\cdot\frac{\partial f_i}{\partial g}\right) & \sum\left(\frac{\partial f_i}{\partial z_o}\right)^2 & \sum\left(\frac{\partial f_i}{\partial z_o}\cdot\frac{\partial f_i}{\partial L}\right) & \sum\left(\frac{\partial f_i}{\partial z_o}\cdot\frac{\partial f_i}{\partial r}\right) \\ \sum\left(\frac{\partial f_i}{\partial L}\cdot\frac{\partial f_i}{\partial x_c}\right) & \sum\left(\frac{\partial f_i}{\partial L}\cdot\frac{\partial f_i}{\partial z_c}\right) & \sum\left(\frac{\partial f_i}{\partial L}\cdot\frac{\partial f_i}{\partial g}\right) & \sum\left(\frac{\partial f_i}{\partial L}\cdot\frac{\partial f_i}{\partial z_o}\right) & \sum\left(\frac{\partial f_i}{\partial L}\right)^2 & \sum\left(\frac{\partial f_i}{\partial L}\cdot\frac{\partial f_i}{\partial r}\right) \\ \sum\left(\frac{\partial f_i}{\partial r}\cdot\frac{\partial f_i}{\partial x_c}\right) & \sum\left(\frac{\partial f_i}{\partial r}\cdot\frac{\partial f_i}{\partial z_c}\right) & \sum\left(\frac{\partial f_i}{\partial r}\cdot\frac{\partial f_i}{\partial g}\right) & \sum\left(\frac{\partial f_i}{\partial r}\cdot\frac{\partial f_i}{\partial z_o}\right) & \sum\left(\frac{\partial f_i}{\partial r}\cdot\frac{\partial f_i}{\partial L}\right) & \sum\left(\frac{\partial f_i}{\partial r}\right)^2 \end{bmatrix} \begin{bmatrix} \Delta x_c \\ \Delta z_c \\ \Delta g \\ \Delta z_o \\ \Delta L \\ \Delta r \end{bmatrix} = \begin{bmatrix} \sum\left(f_o\cdot\frac{\partial f_i}{\partial x_c}\right) \\ \sum\left(f_o\cdot\frac{\partial f_i}{\partial z_c}\right) \\ \sum\left(f_o\cdot\frac{\partial f_i}{\partial g}\right) \\ \sum\left(f_o\cdot\frac{\partial f_i}{\partial z_o}\right) \\ \sum\left(f_o\cdot\frac{\partial f_i}{\partial L}\right) \\ \sum\left(f_o\cdot\frac{\partial f_i}{\partial r}\right) \end{bmatrix} \quad (14)$$

The value of the z-coordinate is $Z_i$ which is the z-coordinate $gz_i$ of the reference point P (the contact point 41). It is noted that the offset due to the radius of the contact point 41 and the zeroset deviation in the x-direction are disregarded.

$$X_i = x_i + L\left(1 - \frac{\sqrt{L^2 - (gz_i - z_o)^2}}{L}\right) \quad (12)$$

$$Z_i = gz_i$$

Then the center coordinates ($x_c$, $z_c$) and the radius "r" are assigned in the following evaluation formula as arbitrary variables.

$$f_i = \sqrt{(X_i - x_c)^2 + (Z_i - z_c)^2} - r \quad (13)$$

$$= \sqrt{\left\{x_i + L\left(1 - \frac{\sqrt{L^2 - (gz_i - z_o)^2}}{L}\right) - x_c\right\}^2 + (gz_i - z_c)^2} - r$$

In applying the least square method to the evaluation formula (13) (the calibration step), the center coordinates ($x_c$, $z_c$), the radius "r", the gain "g", the zeroset deviation $z_0$ and the arm reference length L are subjected to the calibration., According to the third embodiment with such configuration, the zeroset deviation $z_0$ can be calibrated in addition to the advantages of the above embodiments. Therefore, in the arrangement where the contact point 41 generally matches the reference point P, even if the adjustment for setting the contact point 41 to match the reference point P or the adjustment for setting the detection result of the second detector to zero with the base shaft of the arm 3 (the base line A) being parallel to the x-direction, are inaccurate and hence resulted in a little adjustment error, the zeroset deviation $z_0$ can be calibrated in the present embodiment. Consequently, the work for adjusting the position of the contact point 41 and the zero set of the second detector 7 can be simplified while accurate measurement can be performed.

(Fourth Embodiment)

The following is the description of a fourth embodiment of the present invention. Although the basic configuration in the fourth embodiment is the same as in the first embodiment, the fourth embodiment is characterized in that the arm reference length L and the zeroset deviation $z_0$ are also subjected to the calibration in addition to those subjected to the calibration in the first embodiment.

Figure 5:
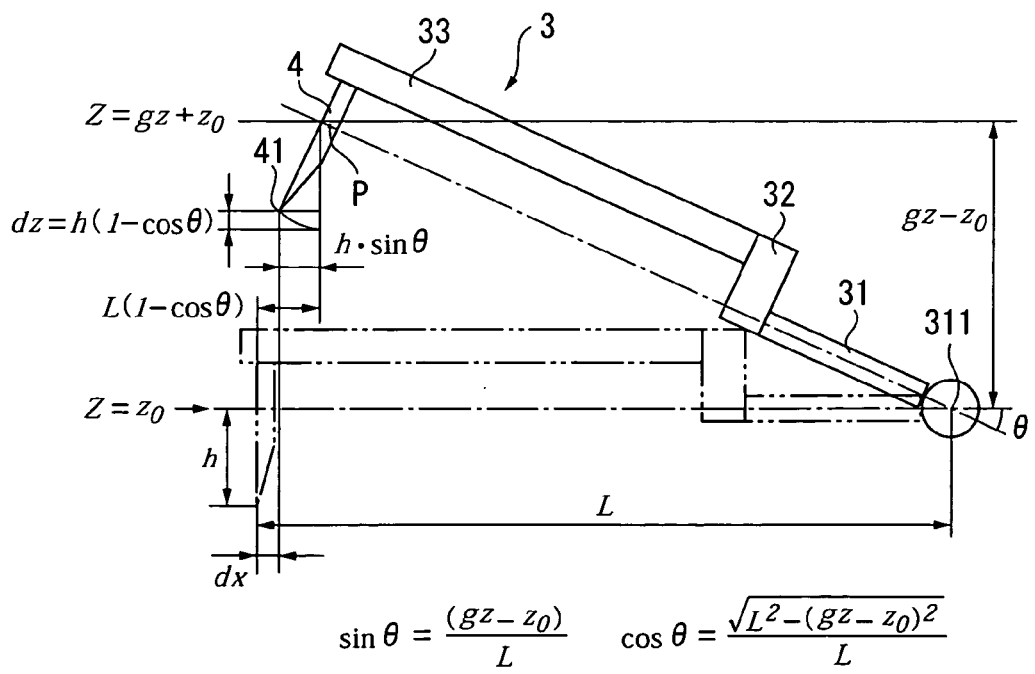
FIG. 5 is an illustration showing a geometric relation of a deviation due to a circular movement of an arm in a fourth embodiment according to a calibration method for the surface texture measuring instrument of the present invention.

In the surface texture measuring instrument 1 in the fourth embodiment, as shown in FIG. 5, the zeroset deviation $z_0$ is the value of the z-coordinate of the reference point P with the base shaft of the arm 3 (the base line A) being parallel to the x-direction (or, the value derived by multiplying the detection result of the second detector 7 by the gain "g" in this condition). In other words, the deviation due to the swing of the arm 3 is represented by the below formula that corresponds to the formulas (5) and (6).

$$dx = L(1 - \cos\theta) - h \cdot \sin\theta \qquad (15)$$

$$= L\left(1 - \frac{\sqrt{L^2 - (gz_i - z_o)^2}}{L}\right) - h\frac{(gz_i - z_o)}{L}$$

$$dz = h(1 - \cos\theta) = h\left(1 - \frac{\sqrt{L^2 - (gz_i - z_o)^2}}{L}\right)$$

In assigning the detection results of the first detector 6 and the second detector 7 in the evaluation formula, the x-coordinate is $X_i$ which is found by counting the deviation dx due to the swing of the swing arm 3 (see the formula (15)) in the detection result $x_i$ of the first detector 6. The value of the z-coordinate is $Z_i$ which is found by counting the deviation dz due to the swing of the arm 3 (see the formula (15)) in the z-coordinate $gz_i$ of the reference point P. It is noted that the offset due to the radius of the contact point 41 and the tip compensation amount "h" are disregarded.

$$X_i = x_i + L\left(1 - \frac{\sqrt{L^2 - (gz_i - z_o)^2}}{L}\right) - h\frac{(gz_i - z_o)^2}{L} \qquad (16)$$

$$Z_i = gz_i + h\left(1 - \frac{\sqrt{L^2 - (gz_i - z_o)^2}}{L}\right)$$

Then the center coordinates of the calibration gauge 10 ($x_c$, $z_c$) and the radius "r" are assigned in the following formula as arbitrary variables.

$$f_i = \sqrt{(X_i - x_c)^2 + (Z_i - z_c)^2} - r \qquad (17)$$

$$= \sqrt{\left\{x_i + L\left(1 - \frac{\sqrt{L^2 - (gz_i - z_o)^2}}{L}\right) - h\frac{(gz_i - z_o)}{L} - x_c\right\}^2 + \left\{gz_i + h\left(1 - \frac{\sqrt{L^2 - (gz_i - z_o)^2}}{L}\right) - z_c\right\}^2} - r$$

In applying the least square method to the evaluation formula (17) (the calibration step), the center coordinates ($x_c$, $z_c$), the radius "r", the gain "g", the zeroset deviation $z_o$, and the arm reference length L are subjected to the calibration.

That is, each of the above parameters for minimizing "s" are found, where "s" is the sum of square of the evaluation formula $f_i$. The calculation formula of the least square method is the formula below.

$$\begin{bmatrix} \sum\left(\frac{\partial f_i}{\partial x_c}\right)^2 & \sum\left(\frac{\partial f_i}{\partial x_c}\cdot\frac{\partial f_i}{\partial z_c}\right) & \sum\left(\frac{\partial f_i}{\partial x_c}\cdot\frac{\partial f_i}{\partial g}\right) & \sum\left(\frac{\partial f_i}{\partial x_c}\cdot\frac{\partial f_i}{\partial h}\right) & \sum\left(\frac{\partial f_i}{\partial x_c}\cdot\frac{\partial f_i}{\partial z_o}\right) & \sum\left(\frac{\partial f_i}{\partial x_c}\cdot\frac{\partial f_i}{\partial L}\right) & \sum\left(\frac{\partial f_i}{\partial x_c}\cdot\frac{\partial f_i}{\partial r}\right) \\ \sum\left(\frac{\partial f_i}{\partial z_c}\cdot\frac{\partial f_i}{\partial x_c}\right) & \sum\left(\frac{\partial f_i}{\partial z_c}\right)^2 & \sum\left(\frac{\partial f_i}{\partial z_c}\cdot\frac{\partial f_i}{\partial g}\right) & \sum\left(\frac{\partial f_i}{\partial z_c}\cdot\frac{\partial f_i}{\partial h}\right) & \sum\left(\frac{\partial f_i}{\partial z_c}\cdot\frac{\partial f_i}{\partial z_o}\right) & \sum\left(\frac{\partial f_i}{\partial z_c}\cdot\frac{\partial f_i}{\partial L}\right) & \sum\left(\frac{\partial f_i}{\partial z_c}\cdot\frac{\partial f_i}{\partial r}\right) \\ \sum\left(\frac{\partial f_i}{\partial g}\cdot\frac{\partial f_i}{\partial x_c}\right) & \sum\left(\frac{\partial f_i}{\partial g}\cdot\frac{\partial f_i}{\partial z_c}\right) & \sum\left(\frac{\partial f_i}{\partial g}\right)^2 & \sum\left(\frac{\partial f_i}{\partial g}\cdot\frac{\partial f_i}{\partial h}\right) & \sum\left(\frac{\partial f_i}{\partial g}\cdot\frac{\partial f_i}{\partial z_o}\right) & \sum\left(\frac{\partial f_i}{\partial g}\cdot\frac{\partial f_i}{\partial L}\right) & \sum\left(\frac{\partial f_i}{\partial g}\cdot\frac{\partial f_i}{\partial r}\right) \\ \sum\left(\frac{\partial f_i}{\partial h}\cdot\frac{\partial f_i}{\partial x_c}\right) & \sum\left(\frac{\partial f_i}{\partial h}\cdot\frac{\partial f_i}{\partial z_c}\right) & \sum\left(\frac{\partial f_i}{\partial h}\cdot\frac{\partial f_i}{\partial g}\right) & \sum\left(\frac{\partial f_i}{\partial h}\right)^2 & \sum\left(\frac{\partial f_i}{\partial h}\cdot\frac{\partial f_i}{\partial z_o}\right) & \sum\left(\frac{\partial f_i}{\partial h}\cdot\frac{\partial f_i}{\partial L}\right) & \sum\left(\frac{\partial f_i}{\partial h}\cdot\frac{\partial f_i}{\partial r}\right) \\ \sum\left(\frac{\partial f_i}{\partial z_o}\cdot\frac{\partial f_i}{\partial x_c}\right) & \sum\left(\frac{\partial f_i}{\partial z_o}\cdot\frac{\partial f_i}{\partial z_c}\right) & \sum\left(\frac{\partial f_i}{\partial z_o}\cdot\frac{\partial f_i}{\partial g}\right) & \sum\left(\frac{\partial f_i}{\partial z_o}\cdot\frac{\partial f_i}{\partial h}\right) & \sum\left(\frac{\partial f_i}{\partial z_o}\right)^2 & \sum\left(\frac{\partial f_i}{\partial z_o}\cdot\frac{\partial f_i}{\partial L}\right) & \sum\left(\frac{\partial f_i}{\partial z_o}\cdot\frac{\partial f_i}{\partial r}\right) \\ \sum\left(\frac{\partial f_i}{\partial L}\cdot\frac{\partial f_i}{\partial x_c}\right) & \sum\left(\frac{\partial f_i}{\partial L}\cdot\frac{\partial f_i}{\partial z_c}\right) & \sum\left(\frac{\partial f_i}{\partial L}\cdot\frac{\partial f_i}{\partial g}\right) & \sum\left(\frac{\partial f_i}{\partial L}\cdot\frac{\partial f_i}{\partial h}\right) & \sum\left(\frac{\partial f_i}{\partial L}\cdot\frac{\partial f_i}{\partial z_o}\right) & \sum\left(\frac{\partial f_i}{\partial L}\right)^2 & \sum\left(\frac{\partial f_i}{\partial L}\cdot\frac{\partial f_i}{\partial r}\right) \\ \sum\left(\frac{\partial f_i}{\partial r}\cdot\frac{\partial f_i}{\partial x_c}\right) & \sum\left(\frac{\partial f_i}{\partial r}\cdot\frac{\partial f_i}{\partial z_c}\right) & \sum\left(\frac{\partial f_i}{\partial r}\cdot\frac{\partial f_i}{\partial g}\right) & \sum\left(\frac{\partial f_i}{\partial r}\cdot\frac{\partial f_i}{\partial h}\right) & \sum\left(\frac{\partial f_i}{\partial r}\cdot\frac{\partial f_i}{\partial z_o}\right) & \sum\left(\frac{\partial f_i}{\partial r}\cdot\frac{\partial f_i}{\partial L}\right) & \sum\left(\frac{\partial f_i}{\partial r}\right)^2 \end{bmatrix} \qquad (18)$$

$$\begin{bmatrix} \Delta x_c \\ \Delta z_c \\ \Delta g \\ \Delta h \\ \Delta z_o \\ \Delta L \\ \Delta r \end{bmatrix} = \begin{bmatrix} \sum\left(f_o \cdot \frac{\partial f_i}{\partial x_c}\right) \\ \sum\left(f_o \cdot \frac{\partial f_i}{\partial z_c}\right) \\ \sum\left(f_o \cdot \frac{\partial f_i}{\partial g}\right) \\ \sum\left(f_o \cdot \frac{\partial f_i}{\partial h}\right) \\ \sum\left(f_o \cdot \frac{\partial f_i}{\partial z_o}\right) \\ \sum\left(f_o \cdot \frac{\partial f_i}{\partial L}\right) \\ \sum\left(f_o \cdot \frac{\partial f_i}{\partial r}\right) \end{bmatrix}$$

According to the fourth embodiment with such configuration, all the parameters necessary for the calibration can be calibrated in addition to the advantages of the above embodiments.

The present invention is not limited to the above-described embodiments, but includes various modifications as long as the object of the present invention can be achieved.

For example, the shape of the arm and the stylus is not limited to the linear shape, but may be a curved shape. Any shape may be applicable as far as the base end is swingably supported, the contact point contacts the workpiece from the direction of the tangent line of the arc, and the texture of the workpiece surface is measured based on the shift distance of the base end and the swing amount of the arm.

While the radius of the contact point is not subjected to the calibration in the above-described embodiments, the calibration may be performed on the radius of the contact point. That is, if the radius of the calibration gauge is known, the radius of the contact point can be found by subtracting the radius of the calibration gauge from the radius obtained with the use of the least square method.

While the surface texture measuring instrument is a contact type instrument of which contact point contacts and scans on the workpiece in the above description, a non-contact type contact point may be used. Even in this case, as long as the radius of the calibration gauge is known, the deviation of the contact point can be calibrated.

While the least square method is used as a solving method for finding each parameter based on the evaluation formula, it may be substituted by other solving methods.

The second detector 7 is arranged between the base point 311 (the swing center) and the reference point P in the described embodiments. Alternatively, the base shaft section 31 may be extended to the right side of the base point 311 (the swing center) and the second detector 7 may be arranged at the right side of the base point 311 (the swing center) in FIG. 1 as an example. Such configuration can be considered the same as those presented in the above embodiments except for the fact that the detection value of the second detector 7 has the sign opposite to that of the above embodiments.

While the gain "g" is determined based on the arm reference length L and the length Lo from the base point to the middle point in the above embodiments, the gain "g" may be calibrated as a total gain "g" in which other variations (e.g. the reference length L, the angularity of the detector, the temperature. etc) are counted.

While the description in the above embodiment is limited to the contact point 41 having a perfectly sphere-shaped tip and the calibration gauge having a perfectly sphere-shaped measurement surface, the shape is not limited to the perfect sphere. Specifically, a second calibration step may be provided, by giving a true shape of the calibration gauge, for calculating the tip shape of the contact point based on the difference from the radius "r" found in the calibration step. Accordingly, since the true shape of the calibration gauge is given, the tip shape of the contact point can be found based on the difference from the radius "r" found in the calibration step. Although the shape of the calibration gauge and the tip shape of the contact point are typically spherical, they are not exactly perfect spheres. Also, lengths from the nominal center of the sphere ($x_c$, $z_c$) to the sphere surface in each angle direction are not necessarily the same. Therefore, the lengths from the nominal center of the calibration gauge to the sphere surface in respective angle direction are measured in advance. Then the lengths in each angle direction corresponding to the detection results in the measurement step are calculated and the difference from the radius "r" found in the calibration step is found. In this way, even when the calibration gauge is not perfect sphere, accurate calibration calculation can be performed.

Similarly, as for the tip shape of the contact point, based on the angle corresponding to the detection result in the measurement step (measurement orientation of contact section and the like of the contact point with the calibration gauge seen from the nominal center of the contact point) and the true shape of the calibration gauge, the length from the nominal center of the contact point to the surface of the contact point at the corresponding angle (measurement orientation) can be found (The distance is found as the difference between the radius "r" at each angle found in the calibration step and the length of a corresponding section of the calibration gauge). Accordingly, if a specific area of the spherical calibration gauge is measured and the contact point is measured at each measurement orientation, the lengths at each measurement orientation can be found and therefore the tip shape of the contact point can be found.

Further, a computer having a CPU (Central Processing Unit) and a memory (storage unit) may be built in the surface texture measuring instrument while arranging a program so that a computer executes each step of the calibration method described in the above embodiments. With this configuration, the compensation formula and evaluation formula in each step and parameters subjected to calibration can be easily changed. The program may be stored in a recording medium and be installed in a computer by directly inserting the recording medium to the computer, or alternatively, a reader device may be externally attached to the computer to install the program in the computer through the reader device. The program may be supplied and installed to the computer wirelessly or through a communication line such as the Internet, LAN cable and telephone line.

What is claimed is:

1. A calibration method for a surface texture measuring instrument that measures a surface of a workpiece, the instrument including: an arm supported to be swingable around a base point; a stylus that is arranged on an end of the arm and is provided with a contact point on a tip thereof; the contact point being in contact or nearly in contact with the workpiece along a substantial tangent line of an arc drawn by a tip of the contact point in accordance with a swing of the arm; a shifter for shifting the arm in x-direction while keeping the contact point in contact or nearly in contact with the workpiece surface; a first detector for detecting a displacement of the base point in the x-direction; a second detector for detecting a displacement in z-direction due to the swing of the arm based on a displacement of a point on the arm in the z-direction; and a compensation computing unit that compensates detection results of the first detector and the second detector for a deviation due to the swing to obtain measurement data of the workpiece surface, the calibration method comprising:

a measurement step for measuring a calibration gauge of which cross section contains a part of a substantially perfect circle;

an assignment step for assigning the detection results of the first detector and the second detector, which are obtained in the measurement step, in an evaluation formula based on a circle equation in which the center coordinates of the calibration gauge are ($x_c$, $z_c$) and a radius of the calibration gauge is r;

a calibration step for calibrating gain of z-coordinate of the tip of the contact point relative to the detection result of the second detector and each parameter included in the deviation based on the results obtained in the assignment step; and a storage step for storing the calibrated gain and each calibrated parameter.

2. The calibration method for the surface texture measuring instrument according to claim 1, wherein the evaluation formula in the assignment step is determined based on: an arm reference length L as a length from the base point to a reference point as a foot of a perpendicular line extended from the tip of the contact point to a base shaft of the arm extending in longitudinal direction; a detection value $x_i$ of the first detector; a detection result $z_i$ of the second detector; a gain g of the z-coordinate of the tip of the contact point to the detection result $z_i$ of the second detector; and a tip compensation amount h as a length from the reference point to the tip of the contact point, and wherein, with a known arm reference length L being given, the center coordinates $(x_c, z_c)$, the radius r, the gain g and the tip compensation amount h are found in the calibration step.

3. The calibration method for the surface texture measuring instrument according to claim 2, wherein, based on a designed value of the arm reference length L, the center coordinates $(x_c, z_c)$, the radius r, the gain g, and the tip compensation amount h are found in the calibration step.

4. The calibration method for the surface texture measuring instrument according to claim 1, wherein the evaluation formula in the assignment step is determined based on: an arm reference length L as a length from the base point to the tip of the contact point; a detection value $x_i$ of the first detector; a detection result $z_i$ of the second detector; a gain g of the z-coordinate of the tip of the contact point to the detection result $z_i$ of the second detector; and a zeroset deviation $z_0$ as a value derived by multiplying the detection result of the second detector, which is obtained when a line connecting the base point and the tip of the contact point tip is parallel to the x-direction, by the gain g, and wherein the center coordinates $(x_c, z_c)$ of the circle, the radius of the circle r, the gain g, the arm reference length L and the zeroset deviation $z_0$ are found.

5. The calibration method for the surface texture measuring instrument according to claim 1, wherein the evaluation formula in the assignment step is determined based on: an arm reference length L as a length from the base point to a reference point as a foot of a perpendicular line extended from the tip of the contact point to a base shaft of the arm extending in longitudinal direction; a detection value $x_i$ of the first detector; detection result $z_i$ of the second detector; a gain g of the z-coordinate of the tip of the contact point to the detection result $z_i$ of the second detector; a tip compensation amount h as a length from the reference point to the tip of the contact point; and a zeroset deviation $z_0$ as a value derived by multiplying the detection result of the second detector, which is obtained when the base shaft of the arm is parallel to the x-direction, by the gain g, and wherein the center coordinates $(x_c, z_c)$ of the circle, the radius of the circle r, the tip compensation amount h, the gain g, the zeroset deviation $z_0$ and the arm reference length L are found.

6. The calibration method for the surface texture measuring instrument according to claim 1, further comprising a second calibration step, with a true shape of the calibration gauge being given, for computing a tip shape of the contact point based on difference from the radius r found in the calibration step.

7. The calibration method for the surface texture measuring instrument according to claim 6, wherein the calibration gauge contains at least a part of a perfect circle and the true shape of the calibration gauge is represented by a radius rt of the perfect circle.

8. The calibration method for the surface texture measuring instrument according to claim 6, wherein the tip shape of the contact point contains at least a part of a perfect circle and is represented by the radius of the perfect circle.

9. A calibration program stored on a computer-readable recording medium for a surface texture measuring instrument wherein a computer executes a calibration method for the surface texture measuring instrument that measures a surface of a workpiece, the instrument including: an arm supported to be swingable around a base point; a stylus that is arranged on an end of the arm and is provided with a contact point on a tip thereof, the contact point being in contact or nearly in contact with the workpiece along a substantial tangent line of an arc drawn by a tip of the contact point in accordance with a swing of the arm; a shifter for shifting the arm in x-direction while keeping the contact point in contact or nearly in contact with the workpiece surface; a first detector for detecting a displacement of the base point in the x-direction; a second detector for detecting a displacement in z-direction due to the swing of the arm based on a displacement of a point on the arm in the z-direction; and a compensation computing unit that compensates detection results of the first detector and the second detector for a deviation due to the swing to obtain measurement data of the workpiece surface, the calibration method comprising:

a measurement step for measuring a calibration gauge of which cross section contains a part of a substantially perfect circle;

an assignment step for assigning the detection results of the first detector and the second detector, which are obtained in the measurement step, in an evaluation formula based on a circle equation in which the center coordinates of the calibration gauge are $(x_c, z_c)$ and a radius of the calibration gauge is r;

a calibration step for calibrating gain of z-coordinate of the tip of the contact point relative to the detection result of the second detector and each parameter included in the deviation based on the results obtained in the assignment step; and a storage step for storing the calibrated gain and each calibrated parameter.

10. A computer-readable recording medium storing a calibration program for a surface texture measuring instrument wherein a computer executes a calibration method for the surface texture measuring instrument that measures a surface of a workpiece, the instrument including: an arm supported to be swingable around a base point; a stylus that is arranged on an end of the arm and is provided with a contact point on a tip thereof, the contact point being in contact or nearly in contact with the workpiece along a substantial tangent line of an arc drawn by a tip of the contact point in accordance with a swing of the arm; a shifter for shifting the arm in x-direction while keeping the contact point in contact or nearly in contact with the workpiece surface; a first detector for detecting a displacement of the base point in the x-direction; a second detector for detecting a displacement in z-direction due to the swing of the arm based on a displacement of a point on the arm in the z-direction; and a compensation computing unit that compensates detection results of the first detector and the second detector for a deviation due to the swing to obtain measurement data of the workpiece surface, the calibration method comprising:

a measurement step for measuring a calibration gauge of which cross section contains a part of a substantially perfect circle;

an assignment step for assigning the detection results of the first detector and the second detector, which are obtained in the measurement step, in an evaluation formula based on a circle equation in which the center coordinates of the calibration gauge are ($x_c$, $z_c$) and a radius of the calibration gauge is r; and a calibration step for calibrating gain of z-coordinate of the tip of the contact point relative to the detection result of the second detector and each parameter included in the deviation based on the results obtained in the assignment step; and a storage step for storing the calibrated gain and each calibrated parameter.

11. A surface texture measuring instrument comprising a calibration program for the surface texture measuring instrument, the program being executable by a computer wherein the computer executes a calibration method for the surface texture measuring instrument that measures a surface of a workpiece, the instrument including: an arm supported to be swingable around a base point; a stylus that is arranged on an end of the arm and is provided with a contact point on a tip thereof, the contact point being in contact or nearly in contact with the workpiece along a substantial tangent line of an arc drawn by a tip of the contact point in accordance with a swing of the arm; a shifter for shifting the arm in x-direction while keeping the contact point in contact or nearly in contact with the workpiece surface; a first detector for detecting a displacement of the base point in the x-direction; a second detector for detecting a displacement in z-direction due to the swing of the arm based on a displacement of a point on the arm in the z-direction; and a compensation computing unit that compensates detection results of the first detector and the second detector for a deviation due to the swing to obtain measurement data of the workpiece surface, the calibration method comprising:

a measurement step for measuring a calibration gauge of which cross section contains a part of a substantially perfect circle;

an assignment step for assigning the detection results of the first detector and the second detector, which are obtained in the measurement step, in an evaluation formula based on a circle equation in which the center coordinates of the calibration gauge are ($x_c$, $z_c$) and a radius of the calibration gauge is r; and a calibration step for calibrating gain of z-coordinate of the tip of the contact point relative to the detection result of the second detector and each parameter included in the deviation based on the results obtained in the assignment step; and a storage step for storing the calibrated gain and each calibrated parameter.

* * * * *